Dec. 28, 1971   R. H. DILWORTH III   3,630,882
APPARATUS FOR PARTICLE SEPARATION
Filed June 13, 1968   3 Sheets-Sheet 1
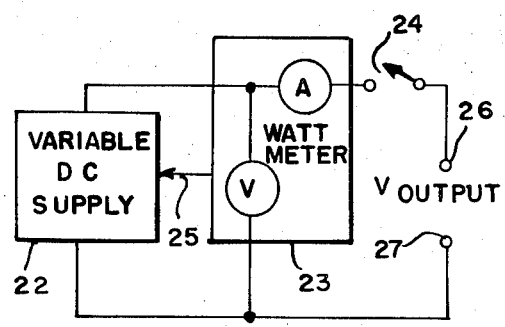
FIG. 3
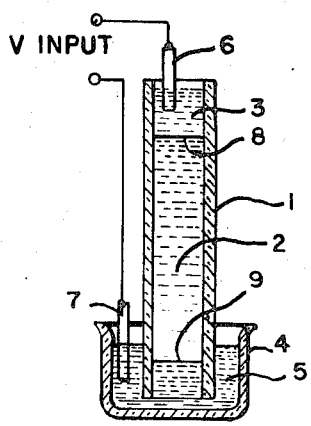
FIG. 1
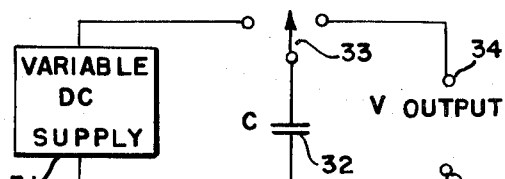
FIG. 4
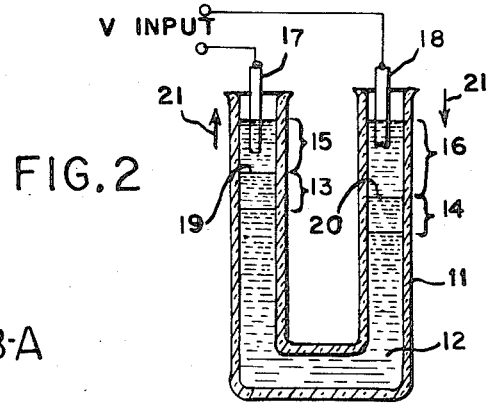
FIG. 2
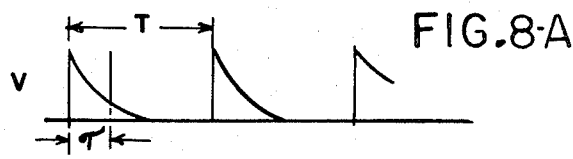
FIG. 8-A
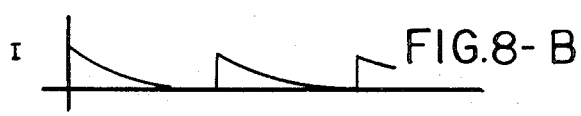
FIG. 8-B
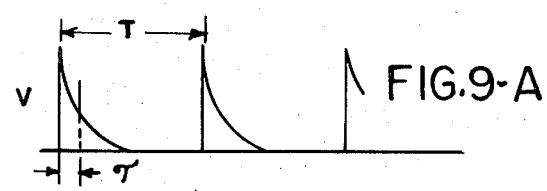
FIG. 9-A
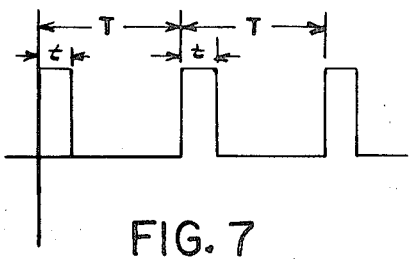
FIG. 7
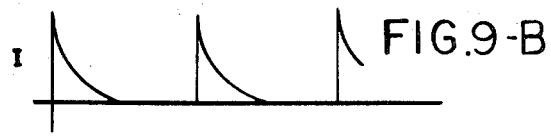
FIG. 9-B
INVENTOR.
ROBERT H. DILWORTH, III
BY Ralph L. Cadwallader
Lawrence P. Benjamin
ATTORNEYS United States Patent Office 3,630,882
Patented Dec. 28, 1971

3,630,882
APPARATUS FOR PARTICLE SEPARATION
Robert H. Dilworth III, Knoxville, Tenn., assignor to
Ortec, Incorporated, Oak Ridge, Tenn.
Filed June 13, 1968, Ser. No. 736,642
Int. Cl. B01k 5/00
U.S. Cl. 204—299                                8 Claims

ABSTRACT OF THE DISCLOSURE

A mixture of particles in a suspending medium is subjected to an intermittent DC electrical field of strength which is sufficient to produce a sharp separation of two or more components of the mixture. The duty cycle of the field is such that electric power dissipation in the mixture produced by the intermittent DC electric field does not materially cause loss of sharpness of separation of the components, and the application of the intermittent DC electric field is regulated in such a way as to produce a selected low average DC power dissipation in the mixture and which may be substantially constant in spite of variations in the impedance of the mixture throughout the period of the separation.

---

This invention relates to process and apparatus for separating particles in a mixture employing electrokinetic phenomena and more particularly for separating particles in a mixture of colloidal particles so that the component particles in the mixture can be identified.

Electrokinetic phenomena includes the coordinated relative movement of finely suspended solids of immiscible liquid droplets (emulsions) through a liquid suspending medium under the influence of an electric field as in the case of electrophoresis. The phenomena also includes corresponding movement of charged particles through gases and the migration of a liquid medium through fixed solids known generally as electro-osmosis. The present invention has application particularly to improve the electrophoresis phenomena and embodiments described herein relate particularly to use which improves electrophoresis techniques. However, features of the invention set forth herein are also applicable to enhance other forms of electrokinetic phenomena such as electro-osmosis, electrophoretic deposition, electrostatic paint spray systems, Cottrell precipitators, and others.

Electrophoresis was first developed for the study of inorganic electrolytes and colloids. However, the most important application of electrophoresis in recent years has been in the study of proteins. This study was advanced greatly by the work of Nobel prize winner Tiselius for his work on the moving boundary method of separation permitting direct optical observation and photographic recording of particle migration. In this method, a sharp boundary is formed between a solution of a colloidal electrolyte such as a protein and a buffer solution against which it is dialyzed. The pH is fixed by the buffer solution which is usually a mixture of a weak electrolyte and its salt, and the boundary between the colloidal electrolyte and the buffer solution is set up in a U-shaped glass cell which connects to electrodes in a vessel containing a reservoir of the buffer solution. The cell is located in the path of an optical system such that the boundary appears as a shadow on an image produced by the optical system. The optical system scans this boundary to produce a component distribution curve across the boundary, the output of the optical system during the scan being related to the protein concentration at the positions through the boundary. The area under the curve produced by this output signal is representative of the amount of protein in solution. By this technique, blood serum was separated into its protein components.

Another type of electrophoresis, known as zone electrophoresis, differs from the moving boundary method in that the components migrate as separate zones rather than as advancing boundaries of overlapping zones and the components are stabilized against convection by movement through buffer in the pores of a semi-solid supporting medium such as filter paper, starch, glass powder, acrylamide gel, etc. These zones are usually not detected until the electrokinetic phenomena is completed and the protein is stained with an appropriate dye.

In both the moving boundary methods and the zone method of electrophoresis, the sharp separation of components is desired and the sharper the separation, the more precise is the method. It is also desirable that the separation be achieved in a minimum time so that apparatus and personnel operate most efficiently. Some of the factors that limit these desirable consequences are (1) Joule heating of the mixture of material causing convective mixing, (2) electrical impedance variation of the material during separation causing variation in power dissipation, and (3) diffusion caused by both the temperature and the time duration of the process.

It is one object of the present invention to provide processes and apparatus for practicing electrokinetic phenomena and particularly the electrophoresis phenomena whereby at least some of the above-mentioned limitations are avoided.

It is another object to provide process and apparatus for practicing the electrophoresis phenomena.

It is another object to provide process and apparatus for increasing the sharpness of separation of a mixture of particles in zone electrophoresis as carried out in gel, and a further object to accomplish this separation in a shorter time than accomplished heretofore with comparative equipment particularly with heat-labile systems.

In accordance with the present invention, the electric field imposed on the mixture of materials is intermittent or pulsed so that particles in the material are alternately subjected to high electric field and low or zero electric field. The greater the electric field, the sharper will be the final separation between components. High electrical dissipation because of this electrical field is minimized by reducing the duty cycle of the pulses so that the average electric power dissipated in the material and medium is maintained at a low constant average value, which is sufficiently low so as to cause negligible Joule heating within the cell and so convective mixing and diffusion rate will be negligible. In addition, the high electric field will cause separation to be more rapid and so the time required to produce the separation is lowered, which lowers total diffusion. The various embodiments described herein set forth processes and apparatus incorporating these features.

These and other objects and features and advantages of the present invention will be understood from the following description taken in conjunction with the figures in which:

FIG. 1 illustrates in simple form the elements of a cell for performing zone electrophoresis;

FIG. 2 illustrates in simple form the elements of a cell for performing moving boundary electrophoresis;

FIGS. 3, 4, 5 and 6 illustrate in increasing complexity, electrical systems for energizing the electrodes in the electrophoresis equipment shown in FIGS. 1 and 2, whereby the present invention is practiced;

FIG. 7 is a waveform showing the output voltage duty cycle from the circuit in FIG. 3;

FIGS. 8a and 8b illustrate the pulses of voltage and current, respectively, delivered from the circuit shown in FIG. 4 to the electrodes of the electrophoresis cell of relatively high impedance;

FIGS. 9a and 9b illustrate pulses of voltage and current, respectively, delivered from the circuit shown in FIG. 4 to the electrodes of the electrophoresis cell of relatively low impedance;

Figure 5:
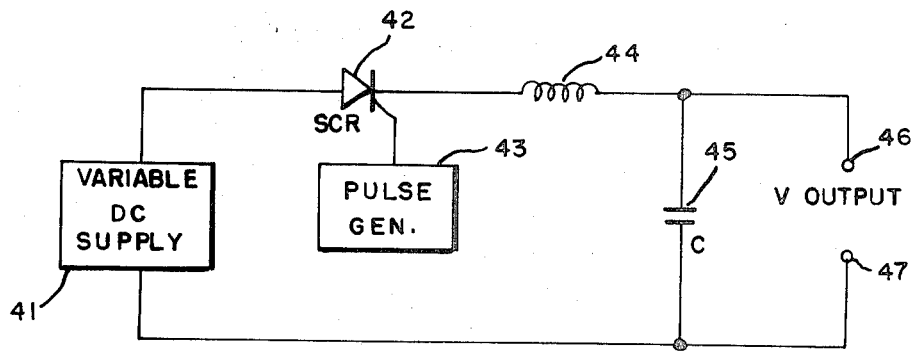

Turning first to FIGS. 1 and 2, there is shown a cell in FIG. 1 for carrying out the zone type electrophoresis phenomena in an electrophoresis gel and in FIG. 2 there is shown a cell for carrying out the moving boundary electrophoresis phenomena. The electrodes in either of these typical cells may be energized in the manner described herein to cause a separation of the various soluble colloids in a mixture and upon accomplishing this separation the positions of the zones and boundaries are identified by variations of optical density and refractive index, respectively.

When electrophoresis is performed in an acrylamide gel supporting medium as shown in FIG. 1, the gel is stained after the electrophoresis separation has been accomplished and the optical density of the stained gel is measured along the gel. The plots are made of optical density (the ordinant) and position (the abscissa). Thus, the plots reveal the constituent materials and the relative amount of them in the mixture. The quantity of each constituent is related to the area under each peak of the plot.

Similar plots are obtained employing the moving boundary cell shown in FIG. 2. In this case, the components of the mixture of colloids in solution are identified as boundaries which move up on one side of the U tube shown, and down on the other side. Commercially available optical apparatus measures the refractive index gradients which are related to concentration gradients of the different components. Plots are prepared of refractive index gradient versus position along the tube and these plots are similar to the plots obtained with the apparatus in FIG. 1 in that the constituent components are evidenced by peaks in the curve plotted, the area under each peak being representative of the relative amount of the constituent material.

The cell for zone electrophoresis shown in FIG. 1 consists of a gel tube 1 containing a soluble medium 2 such as starch gel, glass spheres, sponge rubber, acrylamide gel or the like, denoted 2. The upper end of the gel tube contains an electrolite 3 in contact with the gel 2 and the lower end is inserted in a container 4 containing an electrolite 5 in contact with the other end of the gel. Electrodes 6 and 7 in the electrolites 3 and 5 respectively are energized so that the upper and lower interfaces 8 and 9 of the gel with the electrolites bound an electric field imposed on the gel which causes the electrophoresis separation of different colloidal constituents held as a mixture in the gel media. The moving boundary electrophoresis cell shown in FIG. 2 includes a U tube 11 in which a buffer solution 12 is placed. The test sample, a colloidal mixture is placed in each leg at the tube positions 13 and 14 and layered under fresh buffer solution 15 and 16 in each leg of the tube. The buffer solutions 12, 15 and 16 are selected so that there is minimal mixing due to density differences. Electrodes 17 and 18 are inserted into the buffer solutions 15 and 16 and energized so that an electric field is produced which is bounded by the interfaces 19 and 20 between the solutions 15 and 16 and the samples at 13 and 14.

Upon passing a current through the buffers and sample in the direction of arrow 21, boundaries are formed defining each of the constituents of the sample. These boundaries move upward into buffer solution 15 on one side and downward into buffer solution 12 on the other side. The boundaries are identified with optical equipment which measures refractive index gradients. These gradients are related to concentration gradients, and so the refractive index gradient is a measure of the concentration of a component. The electropherograms are obtained from this data.

Electrophoresis cells shown in FIGS. 1 and 2 are examples of two types which are currently used for the qualitative and quantitative measure of colloidal particles in a mixture in which separation of the particles is accomplished by subjecting the mixture to an electrical field. This same basic electrokinetic process for separating different colloidal components has application in other fields and so does the present invention, as will be apparent from the following detailed description of the process and electrical apparatus for energizing the electrophoresis cells shown in FIGS. 1 and 2.

Turning next to FIGS. 3 to 9, there is shown a number of circuits and waveforms. These circuits are suitable for energizing the electrodes in the electrophoresis cells shown in FIGS. 1 and 2, or the electrodes of any other apparatus with which the invention is practiced.

The circuit of FIG. 3 shows a simple form of apparatus for practicing the invention. DC voltage for producing the electric field is obtained from variable DC supply 22. Output power from the supply is measured by wattmeter 23. An interrupter switch 24 serves to connect the DC supply to the cell, producing by proper choice of its time of closure $t$ and its period $T$ the desired low duty cycle, $t/T$. The output voltage obtained for the cell, as shown in FIG. 7 is preferably a square wave of the required low duty cycle and having a voltage amplitude determined by the DC supply 22.

The current drawn by the typical electrophoresis cell will have a waveform similar to that of the applied voltage, but with a current amplitude determined by the impedance of the cell. As the cell impedance varies through the course of the separation, the current will similarly vary inversely by Ohm's law, unless the DC voltage applied is changed. To regulate the power delivered to the cell to a selected constant power, the output of the wattmeter 23 may be used as shown in in a feedback mechanism 25 or circuit to control the variable DC supply 22 as necessary to produce the required constant average power level in the cell. In this manner, the voltage applied to the electrophoresis cell coupled to output terminals 26 and 27 is high when applied, securing sharpness of separations. However, the duty cycle of voltage application is low, limiting the Joule heating within the cell to a value that makes negligible the effects of convection and diffusion, which otherwise would cause remixing of the components. Furthermore, as the cell impedance varies through the course of the separation, the feedback 25 from the wattmeter 23 to the DC supply 22 provides correction of the DC supply output voltage so as to maintain the chosen average power level.

Heretofore, electrophoresis cells have been energized at constant voltage or constant current. In either case, the power dissipation in the cell has varied as the cell impedance varied. With constant voltage application, the maximum power dissipation in the cell would occur at the time of minimum cell impedance. With constant current, the maximum power dissipation would occur at the time of maximum cell impedance. With either of these prior methods, the selection of voltage or current has been restricted to that which would limit the power to a safe value at the time of maximum dissipation. Thus, at all other times, the cell power would be below optimum, with resultant longer running time for a given separation and greater effects due to diffusion and convection. In the practice of the present invention, the power level in the cell is automatically maintained at the optimum value throughout the separation run. Because of this and the fact that the field, when applied, is higher than in the constant voltage or current case, the time required to perform a given separation by the improved methods described herein is significantly less. This results not only in more efficient use of equipment and personnel, but also in sharper separations due to the decreased time for the diffusion phenomena to operate.

The circuit of FIG. 3 is simple in concept; however, its practical realization involves considerable circuitry to provide the interrupter function in a non-mechanical manner, as well as further circuitry to accomplish the feedback from wattmeter to DC supply. Such circuits are straight-forward and practical, but necessarily complex. A circuit that is more complex in function, but simpler in realization, is illustrated in FIG. 4. It also furnishes the required electric field in the form of high voltage, low duty cycle pulses regulated to constant power in spite of varying cell impedance.

In FIG. 4, a variable DC supply 31 is used to charge a capacitor 32 by means of a double-throw switch 33. This capacitor is then discharged by the switch into the cell, which is connected to output terminals 34 and 35. The switch 32 is operated at a continuous rate of $f$ operations per second. The time interval between pulses, T, is therefore given by $T=1/f$. The waveforms of current and voltage in the cell are shown in FIGS. 8a and b and 9a and b, for the cases of high and low cell impedance, respectively. The cell impedance is essentially resistive, and the capacitor will be discharged by the cell with the familiar exponential decay of the RC circuit formed by the capacitor 32 and the cell connected to output leads 34 and 35. A measure of the width of the voltage pulse is given by the time constant $\tau$, which is the time required for the voltag to decay 63% of its eventual total decay. If the cell impedance is represented by a simple resistance R, this time constant of decay is also defined as $\tau=RC$, where $\tau$ is in seconds, R in ohms, and C in farads.

If the period of repetition of the switch action T and the value of the capacitor C are chosen such that the voltage discharge is substantially complete for each pulse before the next pulse occurs, then the circuit of FIG. 4 will deliver inherently regulated constant power to the cell, even though the cell impedance should vary. The only criteria necessary for delivery of constant power are that the range of cell impedance variation, the size of capacitor C, and the repetition rate $f$ be related to each other so as to always allow substantially complete discharge of each pulse prior to the occurrence of the next.

The waveforms of current and voltage related to the operation of the circuit of FIG. 4 are given in FIGS. 8a and 8b for the case of a relatively high cell impedance, and in FIGS. 9a and 9b for the case of relatively low cell impedance. In either case, the peak rise of the voltage at the cell is due to the voltage chosen by the DC supply. In the high cell impedance case of FIGS. 8a and 8b, the current drawn is relatively low, and the time constant $\tau$ relatively long. In the low cell impedance case of FIGS. 9a and 9b, the current drawn is relatively high, and the time constant $\tau$ is relatively short. To achieve the desired small duty cycle of the improved method, the duty cycle, as measured by $\tau/T$, should be kept small The inherent delivery of constant power to a varying load provided by the circuit of FIG. 4 follows from these considerations: The energy stored in the capacitor C at each operation of the switch 32 is given by $E=\frac{1}{2}CV^2$, where E is in Joules, C is in farads, and V in volts. V is the voltage to which the capacitor is charged, and in the circuit of FIG. 4 is the same as the output voltage of the DC supply 31. When the switch 33 is operated at a rate of $f$ per second, and when the capacitor is allowed to discharge substantially completely during each cycle of operation, then the power delivered to the cell at output leads 34 and 35 is given by the rate of energy delivery, $P=fE$, where P is in watts, $f$ is in pulses per second, and E in Joules. Recalling that for this case, $E=\frac{1}{2}CV^2$, the delivered power to the cell is therefore given by $$P=\frac{1}{2}FCV^2$$

Note that only the repetition rate of the switch 33, the DC supply voltage V, and the capacitor value C determine the power, without relation to the effective cell impedance, except for the criterion previously mentioned of substantially complete discharge of capacitor C at each individual pulse.

From the preceeding description, it is evident that the very simple circuit of FIG. 4 accomplishes the required criteria for practising the presently described invention by providing high voltage, unidirectional pulses of voltage at a low duty cycle with regulation to constant average power in the cell in spite of varying cell impedance.

The double-throw switch 33 of the circuit in FIG. 4 may be realized practically by a mechanical device. However, greater reliability and speed can be secured by utilizing electronic means of switching. A suitable method is shown in FIG. 5. The variable DC supply 41 is connected through a silicon controlled rectifier (SCR) 42 and an inductance 44 to the capacitor 45. The capacitor connects through output leads 46 and 47 to the cell, and will discharge into the cell in the same manner as previously described for the circuit of FIG. 4. However, charging of the capacitor is accomplished by turning on the SCR by means of a pulse generator 43, and allowing the inductance 44 and capacitor 45 to chare resonantly. In so doing, the voltage across the capacitor 45 will rise to twice the value of the DC supply, with a rise time determined by the values of inductance 44 and capacitor 45. The capacitor value is chosen to suit the desired range of output power, and the inductance value is chosen to provide a rapid rise time of capacitor charging compared to the discharge period previously defined as T. Just after the voltage on the capacitor 45 reaches its peak, the further transient of the resonant circuit would tend to make the voltage across the SCR 42 go negative in polarity. At that point, the SCR ceases to conduct, breaking the circuit between the DC supply and the capacitor, and leaving the capacitor charged to twice the DC supply voltage. All of this resonant charging phenomena takes place very rapidly compared to the period of the pulse generator 43, so that for all practical purposes related to the discharge of the capacitor into the cell, the charging of the capacitor is instantaneous. If the pulse generator 43 triggering the SCR is operated at frequency $f$ per second, the action of the circuit of FIG. 5 in delivering constant output power to the cell is the same as that previously described for FIG. 4. Note, however, that the resonant charging of the capacitor places a voltage on the capacitor that is twice that of the DC supply. Accordingly, if the DC supply voltage is V volts, the formula for delivered power from the circuit of FIG. 5 is $P=2fCV^2$, using the same units and explanation as previously developed for FIG. 4. Again, it is seen that so long as the capacitor value, the frequency of the pulse generator, and the range of cell impedance are related to each other so as to allow substantially complete discharge of the capacitor between pulses, the power will be inherently constant regardless of cell impedance variation during the separation run. Having chosen $f$ and C to suit this criterion, the desired power level is chosen by the selection of the DC supply voltage V.

Figure 6:
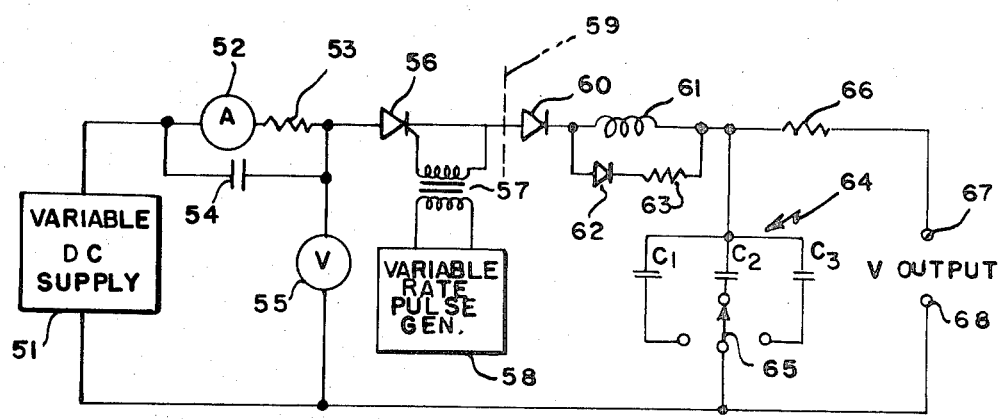

The basic circuit of FIG. 5 is shown in a fully convenient form in the circuit of FIG. 6. The basic elements, functioning the same as explained for FIG. 5, are the variable DC supply 51, the SCR 56, the inductance 61, the capacitance 64, and the output leads 67 and 68. Ammeter 52 and voltmeter 55 allow monitoring of the voltage, current, and power levels, with network 53 and 54 providing smoothing of the pulsed output current for the ammeter. Pulse transformer 57 provides isolated connection of the pulse generator 58 to the gate and cathode of SCR 56. The dashed line 59 illustrates the point at which duplicates of the circuit to the right of the line could be connected to a single DC supply, SCR, and pulse generator, for the purpose of driving two or more sets of cells from a single pulsed power source, allowing individual selection of power level by means of the choice of capacitor 64. Diode 60 provides the necessary isolation to allow this duplication when needed. Diode 62 and resistor 63 form a network for damping the natural oscillations of inductor 61 just after SCR 56 turns off. The capacitor 64 is shown as a bank of selectable capacitors C1, C2, C3 etc. chosen by switch 65, to make convenient selection of desired power level and discharge time constant. Resistor 66, in series with the output leads 67 and 68, limits the output current in the event of a short circuit accidentally appearing at leads 67 and 68.

In using a circuit such as that of FIG. 6, the user has at his control the values of DC supply V, the pulse generator rate $f$, and the capacitor size C. For a given type of cell or cells to be polarized by the circuit, a related range of cell impedance variation exists. The selection of $f$ and to some extent C are made to insure substantially complete discharge of C between pulses, in order to assure constancy of delivered power. This same selection of $f$ and C will also provide a low duty cycle of electric field application to the cell. The remaining choice of value of C and the voltage V are chosen to secure the average power level in the cell that is below the point of excessive convection mixing and diffusion, but which uses the highest values of V that are suitable to other criteria. By this criteria of selection, the sharpness of separation obtainable with high voltage is secured, but because of the low duty cycle, the convective mixing and diffusion due to heat are avoided. Also, the time required to complete a given separation run is significantly reduced compared to previous methods using constant voltage or constant current application of field.

Figure 10:
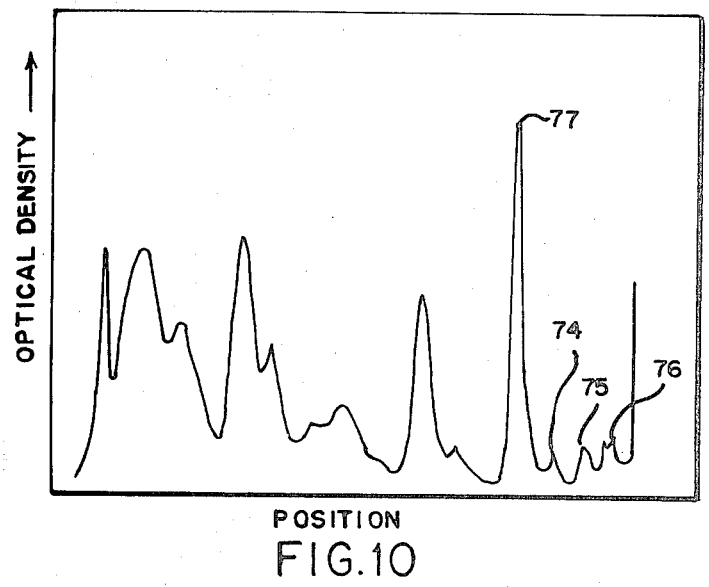
FIG. 10 is an electropherogram of human blood plasma that can be obtained with apparatus incorporating features of the present invention.
Figure 11:
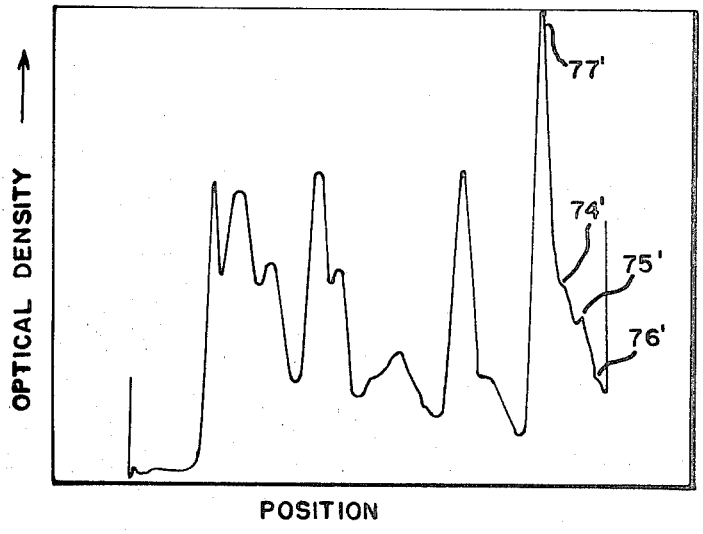
FIG. 11 illustrates an electropherogram of the same human blood plasma obtained with conventional electrophoresis apparatus not incorporating features of the present invention for comparison with FIG. 10.

Examples of the advantages of the improved electrophoresis method disclosed are shown in FIGS. 10 and 11. These zymograms are plots of optical density versus position of blood plasma esterase isoenzymes separated by electrophoresis in acrylamide gel and then reacted with a dye substrate complex. These separations were obtained with apparatus such as shown in FIG. 1, and represent a typical modern use of electrophoresis in the analysis of important body fluids. The zymogram in FIG. 10 was obtained by using the pulsed constant power electric field application from apparatus as described in FIG. 6. The zymogram in FIG. 11 was obtained by the use of DC constant current application of electric field, which was the optimum method in prior art for this application. All other conditions relating to the two zymograms were identical.

The superior sharpness of separation obtained with the improved method are evident in the clear separation of the peaks marked 74, 75 and 76 in FIG. 10. Also, the large peak 77 to the left of 74 is separated fully. By comparison, these same peaks in FIG. 11 denoted 74', 75' and 76' are merely shoulders on the large peak 77', not distinct themselves, and obscuring the true dimensions of the large peak. The usual analysis procedure for these zymograms involves integrating the area under each individual peak in order to measure the quantity of each individual component. Obviously, the accuracy with which this can be done is markedly superior in FIG. 10 with respect to the large peak and the three small ones, since all four are obscured into each other in FIG. 11.

The time required to produce the separation in FIG. 10 was 44 minutes. The time required to produce the separation in FIG. 11 was 1 hour 15 minutes. This is illustrative of the shortened time of separation of the improved method secured with simultaneous better separation.

From the foregoing, it can be seen that there is herein provided an improved method and apparatus for separating different colloidal particles in a mixture of colloidal particles and more particularly for separating and identifying the constituents of a mixture held in an electrophoresis cell. Many other embodiments may be made of the inventive concepts set forth herein. It is to be understood that all matter herein is presented by way of example and not as a limitation.

What is claimed is:

1. Apparatus for separating different colloidal particles in a mixture of colloidal particles contained in a medium comprising:
   container means;
   means for producing an intermittent unidirectional DC electric field and for subjecting the contained medium thereto;
   means to pulsate the DC field in a particular duty cycle, whereby the peak strength of the field is sufficiently high to produce sharp separation of components in the mixture;
   means to adjust the duty cycle of the field such that electric power dissipation in the mixture has a substantially negligible effect on the sharpness of separation; and
   non-manual electrical switch means for maintaining the power dissipation of the field in the mixture substantially constant.

2. Apparatus as in claim 1 and in which,
   the means for producing an intermittent DC electric field in the medium includes,
      two electrodes bounding the DC electric field,
      capacitor means,
      means coupling the capacitor means to the electrodes whereby the capacitor means discharges through the colloidal particles, and
      controlled means for periodically charging the capacitor means.

3. Apparatus as in claim 2 and in which,
   the means for charging the capacitor means includes,
      a supply of DC power,
         the switch means couples the supply to the capacitor means, and
      means for controlling the rate of the switch means.

4. Apparatus as in claim 3 and in which,
   the switch means is a silicon controlled rectifier, and
   the control means includes a pulse generator coupled to the control terminal of the rectifier.

5. Apparatus as in claim 3 and in which,
   the capacitor means is variable.

6. Apparatus as in claim 3 and in which,
   the DC power voltage is variable.

7. Apparatus as in claim 3 and further including,
   means for measuring the DC power, producing a feedback signal indicative thereof, and
   means for coupling the feedback signal to the supply of DC power,
   whereby the DC power is controlled.

8. Apparatus as in claim 7 and in which,
   the feedback signal maintains the DC power constant.

References Cited

UNITED STATES PATENTS

| | | | |
|---|---|---|---|
| 2,740,756 | 4/1956 | Thomas | 204—180 R |
| 3,029,196 | 4/1962 | Matz et al. | 204—180 R |
| 3,201,256 | 8/1965 | Clark et al. | 99—63 |
| 3,470,080 | 9/1969 | Raymond et al. | 204—180 R |
| 3,506,554 | 4/1970 | Broome | 204—180 R |
| 3,539,494 | 11/1970 | Pretorius et al. | 204—299 |

OTHER REFERENCES

Schwalbe: "Pulsed Field Electrophoresis," Medical Electronics, Internat. Conf. on Medical Electronics, Paris, 1959, QT34I64m (1959).

JOHN H. MACK, Primary Examiner

A. C. PRESCOTT, Assistant Examiner

U.S. Cl. X.R.

204—180 G